US009482199B2

United States Patent
Sakai

(10) Patent No.: US 9,482,199 B2
(45) Date of Patent: Nov. 1, 2016

(54) HYDRAULIC PRESSURE SUPPLY SYSTEM

(71) Applicant: HONDA MOTOR CO., LTD., Tokyo (JP)

(72) Inventor: Kohei Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/771,092

(22) PCT Filed: Jan. 7, 2014

(86) PCT No.: PCT/JP2014/050079
§ 371 (c)(1),
(2) Date: Aug. 27, 2015

(87) PCT Pub. No.: WO2014/136465
PCT Pub. Date: Sep. 12, 2014

(65) Prior Publication Data
US 2016/0003208 A1    Jan. 7, 2016

(30) Foreign Application Priority Data
Mar. 8, 2013   (JP) ................................ 2013-046375

(51) Int. Cl.
*B60W 10/02*    (2006.01)
*B60W 10/06*    (2006.01)
(Continued)

(52) U.S. Cl.
CPC ......... *F02N 15/022* (2013.01); *F02N 11/0829* (2013.01); *F16D 48/06* (2013.01); *F16D 48/066* (2013.01); *F16H 61/02* (2013.01);
(Continued)

(58) Field of Classification Search
None
See application file for complete search history.

(56) References Cited

U.S. PATENT DOCUMENTS

| | | | |
|---|---|---|---|
| 2011/0237394 A1* | 9/2011 | Hirai | B60W 10/02 477/167 |
| 2011/0247443 A1* | 10/2011 | Shimizu | F16H 61/0021 74/473.11 |
| 2012/0209495 A1* | 8/2012 | Sakai | B60K 6/485 701/102 |

FOREIGN PATENT DOCUMENTS

| JP | 2008-69852 A | 3/2008 |
|---|---|---|
| JP | 2010-179790 A | 8/2010 |

(Continued)

OTHER PUBLICATIONS

International Search Report dated Apr. 8, 2014, issued in counterpart application No. PCT/JP2014/050079 (2 pages).

*Primary Examiner* — Edwin A Young
(74) *Attorney, Agent, or Firm* — Westerman, Hattori, Daniels & Adrian, LLP

(57) ABSTRACT

A hydraulic pressure supply system, which is capable of properly controlling a degree of engagement of a clutch, thereby making it possible to improve vehicle drivability. The hydraulic pressure supply system includes a first hydraulic pressure supply device that uses an internal combustion engine as a motive power source and supplies hydraulic pressure to the clutch, and a second hydraulic pressure supply device that supplies hydraulic pressure to the clutch by being driven by a motive power source other than the engine, detects a vehicle speed and a rotational difference parameter that represents a difference in rotational speed between an output shaft of the clutch and an input shaft of the clutch, and controls clutch supply hydraulic pressure which is hydraulic pressure supplied to the clutch, according to the detected vehicle speed and rotational difference parameter, when restart conditions of the engine are satisfied.

11 Claims, 9 Drawing Sheets

(51) Int. Cl.
  *F02N 15/02* (2006.01)
  *F16H 61/02* (2006.01)
  *F16D 48/06* (2006.01)
  *F02N 11/08* (2006.01)

(52) U.S. Cl.
  CPC .......... *F16D2500/1026* (2013.01); *F16D 2500/1088* (2013.01); *F16D 2500/3058* (2013.01); *F16D 2500/3067* (2013.01); *F16D 2500/3069* (2013.01); *F16D 2500/30415* (2013.01); *F16D 2500/30426* (2013.01); *F16D 2500/3101* (2013.01); *F16D 2500/3108* (2013.01); *F16D 2500/3144* (2013.01); *F16D 2500/31433* (2013.01); *F16D 2500/31466* (2013.01); *F16D 2500/50883* (2013.01); *F16D 2500/70406* (2013.01)

(56) References Cited

FOREIGN PATENT DOCUMENTS

| | | |
|---|---|---|
| JP | 2010-281398 A | 12/2010 |
| JP | 2012-86774 A | 5/2012 |
| JP | 2012-97790 A | 5/2012 |

* cited by examiner

HYDRAULIC PRESSURE SUPPLY SYSTEM

TECHNICAL FIELD

The present invention relates to a hydraulic pressure supply system for supplying hydraulic pressure to a hydraulic clutch for connecting and disconnecting between an internal combustion engine that is installed on a vehicle as a motive power source and is automatically stopped and restarted, and drive wheels of the vehicle.

BACKGROUND ART

Conventionally, as a hydraulic pressure supply system of this type, for example, one disclosed in PTL 1 has been known. The engine has an output shaft connected to drive wheels of a vehicle via a clutch and a belt-type continuously variable transmission. Further, the engine is automatically stopped when predetermined stop conditions are satisfied, and is restarted when predetermined restart conditions are satisfied during stoppage or traveling of the vehicle. The hydraulic pressure supply system has an oil pump, which uses the engine as a motive power source, for supplying hydraulic pressure to the clutch.

In the hydraulic pressure supply system, during automatic stop of the engine, the hydraulic pressure supplied to the clutch (hereinafter referred to as "the clutch supply hydraulic pressure") is reduced to a predetermined hydraulic pressure. This releases the clutch to disconnect between the automatically stopped engine and the continuously variable transmission, whereby the belt of the continuously variable transmission is prevented from slipping with respect to a pulley during time from the automatic stop of the engine to the stop of the vehicle. Further, during the automatic stop of the engine, if the restart conditions are satisfied, a restarting operation is started to restart the engine, and the clutch supply hydraulic pressure is increased to the predetermined hydraulic pressure. This causes the clutch to connect between the engine and the continuously variable transmission, whereby the driving force of the engine is transmitted to the drive wheels via the clutch and the continuously variable transmission.

CITATION LIST

Patent Literature

[PTL 1] Japanese Laid-Open Patent Publication (Kokai) No. 2012-97790

SUMMARY OF INVENTION

Technical Problem

As described above, in the conventional hydraulic pressure supply system, the supply of hydraulic pressure to the clutch is performed only by an oil pump that uses the engine as a motive power source. Therefore, the hydraulic pressure cannot be supplied to the clutch during time from satisfaction of the restart conditions of the engine to completion of the restart of the engine. This makes it impossible to quickly connect between the engine and the drive wheels by the clutch, and hence the start and acceleration of the vehicle are delayed, causing degradation of its drivability.

Further, in the conventional hydraulic pressure supply system, the engine is automatically stopped when the stop conditions are satisfied during traveling of the vehicle, and hence there is a case where the engine is restarted after the engine is automatically stopped and before the vehicle is stopped. In this case, when the vehicle speed is relatively high or when the difference in rotational speed between the output shaft and input shaft of the clutch is relatively large, if the engine is hastily connected to the drive wheels, the engine acts as a large load for the drive wheels, which may cause a large shock to degrade vehicle drivability. On the other hand, the conventional hydraulic pressure supply system merely uniformly increases the clutch supply hydraulic pressure to the predetermined hydraulic pressure at the restart of the engine, and hence, there is a fear of occurrence of the above-described problem, i.e. the problem of a large shock being caused, degrading vehicle drivability.

The present invention has been made to provide a solution to the above-described problem, and an object thereof is to provide a hydraulic pressure supply system that is capable of properly controlling a degree of engagement of a clutch at the restart of an internal combustion engine to thereby improve vehicle drivability.

Solution to Problem

To attain the above object, the invention according to claim 1 is a hydraulic pressure supply system for supplying hydraulic pressure to a hydraulic clutch (forward clutch 12 in an embodiment (the same applies hereinafter in this section)) which connects and disconnects between an internal combustion engine 3 that is installed on a vehicle as a motive power source and is stopped when predetermined stop conditions are satisfied and restarted when predetermined restart conditions are satisfied, and drive wheels DW of the vehicle, wherein the stop conditions include a condition that a speed of the vehicle is not higher than a predetermined stop vehicle speed which is larger than 0, the hydraulic pressure supply system comprising a first hydraulic pressure supply device (oil pump 31) that uses the engine 3 as a motive power source, and supplies hydraulic pressure to the clutch, a second hydraulic pressure supply device (pressure accumulator 61) that supplies hydraulic pressure to the clutch by being driven by a motive power source other than the engine 3 (first accumulator 63, second accumulator 65), detection means (first rotational speed sensor 71, second rotational speed sensor 73, ECU 2, vehicle speed sensor 76) for detecting at least one of the speed of the vehicle and a rotational difference parameter indicative of a difference in rotational speed between an output shaft (main shaft 21) of the clutch and an input shaft (input shaft 14) of the clutch, and hydraulic pressure control means (ECU 2, hydraulic pressure control valve SV, steps 4 to 9) for controlling clutch supply hydraulic pressure which is hydraulic pressure supplied to the clutch, according to at least one of the vehicle speed (vehicle speed VP) and the rotational difference parameter DN, detected by the detection means, when the restart conditions of the engine 3 have been satisfied.

With this configuration, hydraulic pressure is supplied from the first hydraulic pressure supply device using the engine as a motive power source, and the second hydraulic pressure supply device driven by a motive power source other than the engine, to the hydraulic clutch that connects and disconnects between the engine and the drive wheels of the vehicle. Further, at least one of the vehicle speed and the rotational difference parameter indicative of difference in rotational speed between the output shaft and the input shaft of the clutch is detected by the detection means. Further, when the restart conditions of the engine are satisfied, the clutch supply hydraulic pressure that is hydraulic pressure supplied to the clutch is controlled according to at least one of the detected vehicle speed and rotational difference parameter.

When the restart conditions of the engine are satisfied, hydraulic pressure can be supplied to the clutch, using the second hydraulic pressure supply device that is driven by the motive power source other than the engine, and hence it is possible to supply hydraulic pressure to the clutch even before the restart of the engine is completed. This makes it possible to quickly connect between the engine and the drive wheels by the clutch, whereby the driving force of the engine can be quickly transmitted to the drive wheels, and hence it is possible to quickly start and accelerate the vehicle and improve its drivability.

Further, the stop conditions of the engine include a condition that the vehicle speed is not higher than the predetermined vehicle speed which is larger than 0, and hence, for example, there is a case where during traveling of the vehicle, the engine is stopped due to satisfaction of the stop conditions and the engine is restarted due to satisfaction of the restart conditions. In this case, when the vehicle speed is relatively high, or when the difference in rotational speed between the output shaft and the input shaft of the clutch is relatively large, if a hasty connection between the engine and the drive wheels is performed by the clutch, there is a possibility that friction of the engine suddenly acts on the drive wheels, whereby a large shock is caused to degrade vehicle drivability.

On the other hand, in a case where the restart conditions are satisfied during traveling of the vehicle, when the vehicle speed is relatively low, or when the difference in rotational speed between the output shaft and the input shaft of the clutch is relatively small, a shock is hardly caused even when a hasty connection between the engine and the drive wheels is performed by the clutch, and it is rather preferable to quickly connect between the engine and the drive wheels by the clutch so as to quickly transmit the driving force of the engine to the drive wheels.

With the above-described configuration, when the restart conditions of the engine are satisfied, the clutch supply hydraulic pressure is controlled according to at least one of the detected vehicle speed and rotational difference parameter, and hence it is possible to properly control the degree of engagement of the clutch according to at least one of the parameters. This makes it possible to suppress the shock caused by connection by the clutch at restart of the engine, and quickly connect between the engine and the drive wheels when a shock is not caused, which in turn makes it possible to further improve vehicle drivability.

The invention according to claim 2 is the hydraulic pressure supply system according to claim 1, wherein the hydraulic pressure control means controls the clutch supply hydraulic pressure in a first control mode, when the vehicle speed is not lower than a predetermined vehicle speed VPREF and also the difference in rotational speed between the output shaft and the input shaft, which is represented by the rotational difference parameter DN, is not smaller than a predetermined value DNREF (step 7), and controls the clutch supply hydraulic pressure in a second control mode, when the vehicle speed is lower than the predetermined vehicle speed VPREF or the difference in rotational speed between the output shaft and the input shaft, which is represented by the rotational difference parameter DN, is smaller than the predetermined value DNREF (step 9), and wherein the first control mode is a mode for controlling the clutch supply hydraulic pressure such that a degree of engagement of the clutch is increased more gently than in the second control mode.

With this configuration, in a case where the restart conditions are satisfied, the clutch supply hydraulic pressure (hydraulic pressure supplied to the clutch) is controlled in the first control mode, when the detected vehicle speed is not lower than the predetermined vehicle speed and also the difference in rotational speed between the output shaft and the input shaft, which is represented by the detected rotational difference parameter, is not smaller than the predetermined value, that is, when a shock would be caused in a case where a hasty connection between the engine and the drive wheels is performed by the clutch.

Further, in a case where the restart conditions are satisfied, the clutch supply hydraulic pressure is controlled in the second control mode when the detected vehicle speed is lower than the predetermined vehicle speed or the difference in rotational speed between the output shaft and the input shaft, which is represented by the detected rotational difference parameter, is smaller than the predetermined value, that is, when a shock is not caused by connection between the engine and the drive wheels by the clutch. Further, when the first control mode is selected, that is, when a shock would be caused by connection between the engine and the drive wheels by the clutch, the clutch supply hydraulic pressure is controlled such that the degree of engagement of the clutch is increased more gently than in the case of the second control mode which is selected when a shock is not caused. This makes it possible to gently increase the degree of engagement of the clutch, and hence, it is possible to properly obtain the same advantageous effect of the invention according to claim 1, that is, the advantageous effect that it is possible to suppress a shock caused by the connection by the clutch at restart of the engine, and quickly connect between the engine and the drive wheels when a shock is not caused.

Further, when the engine is automatically stopped during downhill traveling of the vehicle, compared with a case of uphill traveling of the same, the vehicle speed is not easily reduced due to gravity, and hence there is a case where the vehicle speed is relatively high and the difference in rotational speed between the output shaft and the input shaft of the clutch is relatively large. Particularly in this case, a large shock is caused by a hasty connection by the clutch. According to the present invention, it is possible to gently increase the degree of engagement of the clutch when the detected vehicle speed is not lower than the predetermined vehicle speed and also the difference in rotational speed between the output shaft and the input shaft, which is represented by the detected rotational difference parameter, is not smaller than the predetermined value. Therefore, also in the case of the above-mentioned downhill traveling of the vehicle, it is possible to properly suppress the shock caused by the connection by the clutch.

The invention according to claim 3 is the hydraulic pressure supply system according to claim 1 or 2, wherein the hydraulic pressure control means controls the clutch supply hydraulic pressure such that the clutch becomes fully engaged during time from satisfaction of the restart conditions to initial combustion of the engine 3 (FIG. 8, FIG. 9).

With this configuration, it is possible to fully engage the clutch during time from satisfaction of the restart conditions to initial combustion of the engine 3, and hence it is possible to transmit the driving force of the engine to the drive wheels immediately after the initial combustion of the engine, which in turn makes it possible to further improve vehicle drivability.

The invention according to claim 4 is the hydraulic pressure supply system according to any one of claims 1 to 3, wherein the hydraulic pressure control means controls hydraulic pressure supplied from the second hydraulic pressure supply device.

As described above, the first hydraulic pressure supply device is driven by the engine and the second hydraulic pressure supply device is driven by the motive power source other than the engine, and hence during time after satisfaction of the restart conditions of the engine to completion of the restart of the engine, hydraulic pressure is not supplied from the first hydraulic pressure supply device, but is supplied only from the second hydraulic pressure supply device, to the clutch. With the above-described configuration, it is possible to control the clutch supply hydraulic pressure that is supplied from the second hydraulic pressure supply device to the clutch according to the detected vehicle speed or rotational difference parameter when the restart conditions are satisfied, and hence it is possible to more properly obtain the same advantageous effect of the invention according to claim 1, that is, the advantageous effect of improving vehicle drivability.

The invention according to claim 5 is the hydraulic pressure supply system according to any one of claims 1 to 4, wherein the second hydraulic pressure supply device uses an accumulator (first accumulator 63, second accumulator 65) as a motive power source, and the hydraulic pressure control means includes a linear solenoid valve (hydraulic pressure supply control valve SV) for adjusting the clutch supply hydraulic pressure, and in a case where only hydraulic pressure from the second hydraulic pressure supply device is supplied to the clutch, the hydraulic pressure control means controls an opening of the linear solenoid valve to be more increased, compared with a case where hydraulic pressure is supplied from the first hydraulic pressure supply device to the clutch.

With this configuration, the second hydraulic pressure supply device uses an accumulator as a motive power source, and hence, compared with the first hydraulic pressure supply device that uses the engine as the motive power source, the discharge flow rate of oil is smaller. Further, the hydraulic pressure control means has the linear solenoid valve for adjusting the clutch supply hydraulic pressure, and in a case where only the hydraulic pressure from the second hydraulic pressure supply device is supplied to the clutch, the hydraulic pressure control means controls the opening of the linear solenoid valve to be more increased, compared with a case where hydraulic pressure is supplied from the first hydraulic pressure supply device. This makes it possible to control the opening of the linear solenoid valve to a magnitude appropriate to the amount of oil discharged from the second hydraulic pressure supply device that uses the accumulator as the motive power source, whereby it is possible to properly control the supply of hydraulic pressure from the second hydraulic pressure supply device to the clutch.

DESCRIPTION OF EMBODIMENTS

Figure 1:
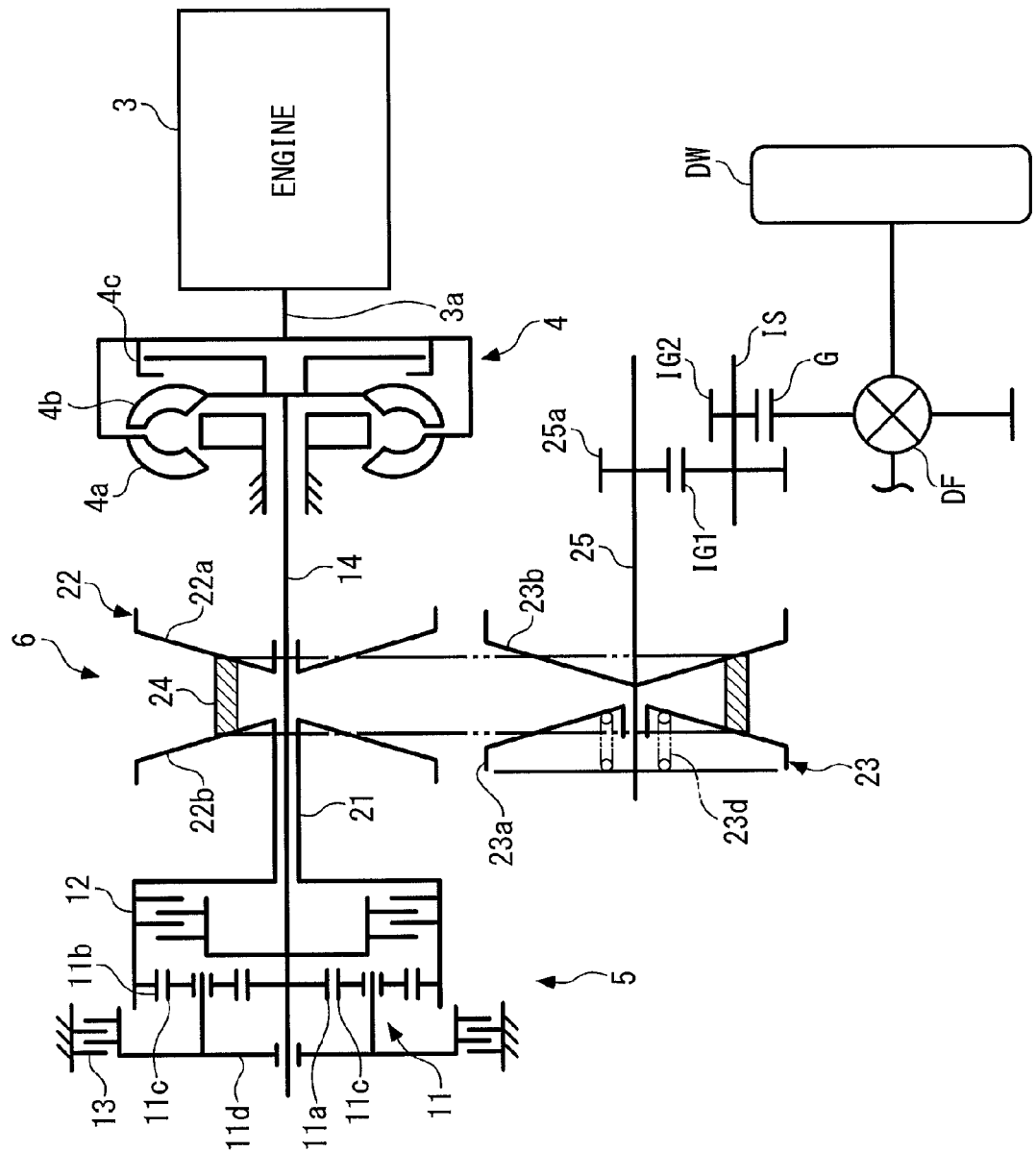
FIG. 1 A skeleton diagram of a drive system for a vehicle, to which is applied a hydraulic pressure supply system according to an embodiment of the present invention.

A preferred embodiment of the present invention will now be described in detail with reference to the drawings. A drive system for a vehicle shown in FIG. 1 includes an internal combustion engine (hereinafter referred to as "the engine") 3 as a motive power source of the vehicle, a torque convertor 4 for transmitting a driving force from the engine 3 to left and right drive wheels DW of the vehicle (only the right drive wheel is shown), a forward/backward travel-switching mechanism 5, and a continuously variable transmission 6. The engine 3 is a gasoline engine having a plurality of cylinders, and includes a crankshaft $3a$ for outputting the driving force. A starter (not shown) for starting the engine 3 is connected to the crankshaft $3a$.

The torque converter 4 is comprised of a pump impeller $4a$, a turbine runner $4b$, and a hydraulic lock-up clutch (hereinafter referred to as the "LU clutch") $4c$. The pump impeller $4a$ is connected to the crankshaft $3a$ and the turbine runner $4b$ is connected to an input shaft 14, referred to hereinafter. Hydraulic oil is filled between the two $4a$ and $4b$. The driving force of the engine 3 is basically transmitted to the input shaft 14 via the pump impeller $4a$, the hydraulic oil, and the turbine runner $4b$.

Figure 2:
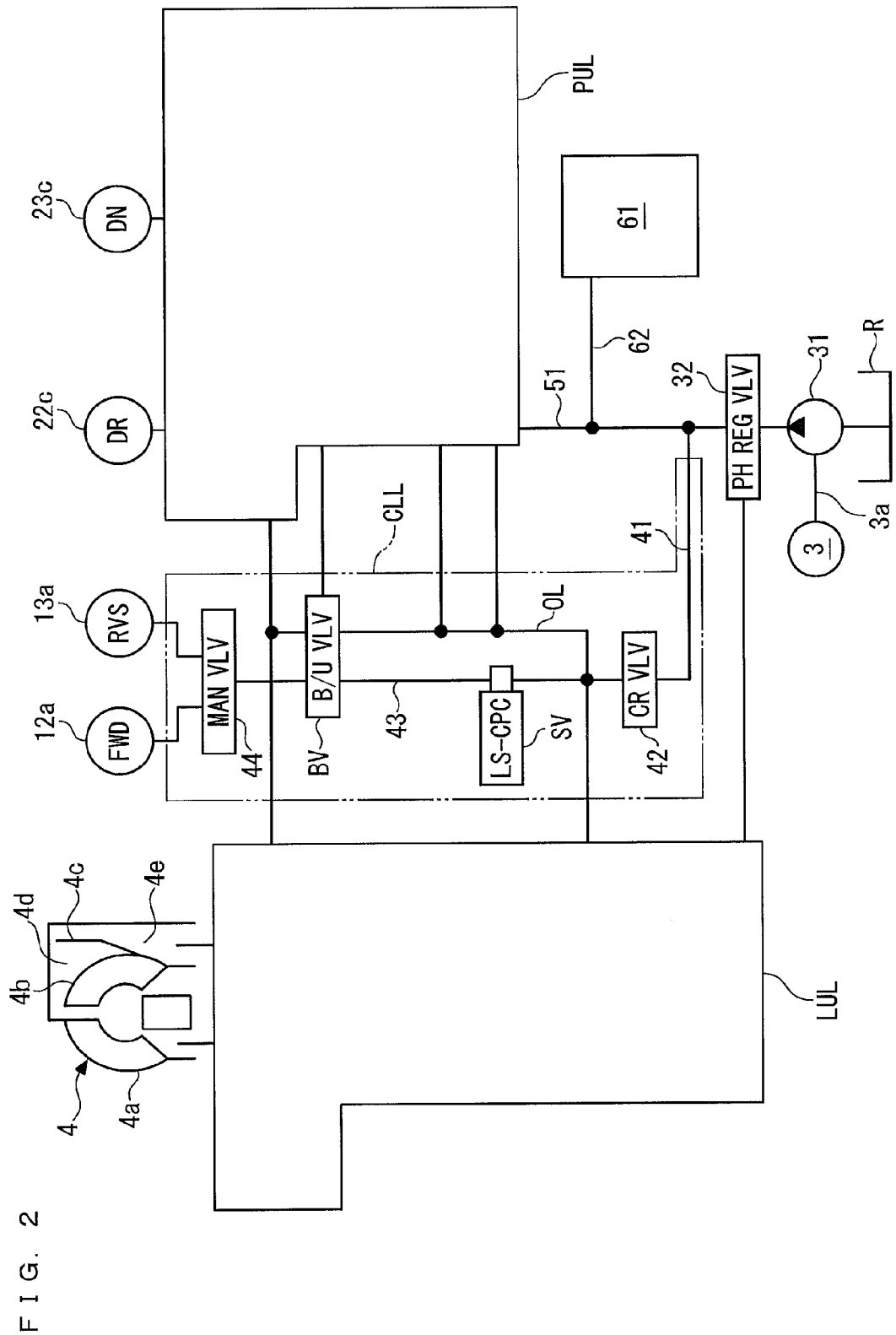
FIG. 2 A view of a hydraulic pressure circuit showing the hydraulic pressure supply system and others.

The LU clutch $4c$ is provided with a first LU oil chamber $4d$ and a second LU oil chamber $4e$ (see FIG. 2). Further, the degree of engagement of the LU clutch $4c$ varies with the hydraulic pressure (amount of hydraulic oil) supplied to the first or second LU oil chamber $4d$ or $4e$.

The forward/backward travel-switching mechanism 5 includes a planetary gear unit 11, a forward clutch 12, and a reverse brake 13. The planetary gear unit 11 is comprised of a sun gear $11a$, a ring gear $11b$, a plurality of planetary gears $11c$ (only two of which are shown) in mesh with the two gears $11a$ and $11b$, and a carrier $11d$ which rotatably supports the planetary gears $11c$. The sun gear $11a$ is integrally provided on the input shaft 14.

The forward clutch 12 is a friction clutch of a hydraulic type, with a clutch inner thereof integrally mounted on the input shaft 14, and a clutch outer thereof integrally mounted on the ring gear $11b$ and a main shaft 21. The main shaft 21 is formed into a hollow cylindrical shape, and the input shaft 14 is rotatably provided inside the main shaft 21. The engagement of the forward clutch 12 causes the input shaft 14 to be directly connected to the main shaft 21, and the release of the forward clutch 12 allows differential rotation between the input shaft 14 and the main shaft 21. Further, the reverse brake 13, which is mounted on the carrier $11d$, unrotatably holds the carrier 11d when in an engaged state and allows rotation of the carrier 11d when in a released state.

Further, the forward clutch 12 includes a FWD oil chamber 12a (see FIG. 2) and a return spring (not shown). When hydraulic pressure is supplied to the FWD oil chamber 12a, the clutch inner is moved against the urging force of the return spring toward the clutch outer and is brought into abutment with the clutch outer, whereby the forward clutch 12 is placed in an engaged state. Further, when the supply of hydraulic pressure to the FWD oil chamber 12a is stopped, the clutch inner is moved toward a side opposite to the clutch outer by the urging force of the return spring, and is separated from the clutch outer, whereby the forward clutch 12 is placed in a released state. In this case, as the clutch inner is moved away from the clutch outer, hydraulic oil filled inside the FWD oil chamber 12a is discharged. The degree of engagement of the forward clutch 12 varies with the hydraulic pressure (amount of hydraulic oil) supplied to the FWD oil chamber 12a.

Similar to the forward clutch 12, the reverse brake 13 is formed by e.g. a friction clutch of a hydraulic type, and includes a RVS oil chamber 13a (see FIG. 2) and a return spring. By supplying hydraulic pressure to the RVS oil chamber 13a, the reverse brake 13 is placed in the engaged state, and by stopping the supply of hydraulic pressure to the RVS oil chamber 13a, the reverse brake 13 is placed in the released state. The degree of engagement of the reverse brake 13 varies with the hydraulic pressure (amount of hydraulic oil) supplied to the RVS oil chamber 13a.

In the forward/backward travel-switching mechanism 5 having the above arrangement, during forward traveling of the vehicle, the forward clutch 12 is engaged and the reverse brake 13 is released, whereby the main shaft 21 rotates in the same direction at the same rotational speed as the input shaft 14 does. On the other hand, during backward traveling of the vehicle, the forward clutch 12 is released and the reverse brake 13 is engaged, whereby the main shaft 21 rotates in a direction opposite to the direction of rotation of the input shaft 14.

The continuously variable transmission 6 is of a belt type, and includes the above-mentioned main shaft 21, an input pulley 22, an output pulley 23, a transmission belt 24, and an auxiliary shaft 25. The input pulley 22 has a movable portion 22a and a fixed portion 22b which are provided on the main shaft 21, and between the two 22a and 22b, a V-shaped belt groove is formed for causing the transmission belt 24 to extend therearound. Further, the movable portion 22a is provided with a DR oil chamber 22c (see FIG. 2).

The output pulley 23 is constructed similarly to the above-described input pulley 22, with a movable portion 23a and a fixed portion 23b provided on the auxiliary shaft 25, and between the two 23a and 23b, a V-shaped belt groove is formed. Further, the movable portion 23a is provided with a DN oil chamber 23c (see FIG. 2), and a return spring 23d. The transmission belt 24 is caused to extend around the two pulleys 22 and 23 in a state fitted in the belt grooves of the two pulleys 22 and 23.

In the continuously variable transmission 6, the effective diameters of the input pulley 22 and the output pulley 23 are steplessly changed by supplying hydraulic pressure to the DR oil chamber 22c of the input pulley 22 and the DN oil chamber 23c of the output pulley 23, whereby a transmission gear ratio between the two pulleys 22 and 23 is steplessly controlled.

Further, the auxiliary shaft 25 has a gear 25a fixed thereto. The gear 25a is in gear with a gear G of a differential gear mechanism DF via a large idler gear IG1 and a small idler gear IG2 integrally provided on an idler shaft IS. The differential gear mechanism DF is connected to the left and right drive wheels DW.

In the drive system having the above arrangement, the driving force of the engine 3 is transmitted to the left and right drive wheels DW via the torque converter 4, the forward/backward travel-switching mechanism 5, the continuously variable transmission 6, and the differential gear mechanism DF. In doing this, the direction of rotation of the transmitted driving force is switched between the direction of normal rotation and the direction of reverse rotation by the forward/backward travel-switching mechanism 5, whereby the forward traveling and backward traveling of the vehicle are performed. Further, the driving force of the engine 3 is transmitted to the drive wheels DW in a state steplessly changed in speed by the continuously variable transmission 6.

Further, FIG. 2 shows the hydraulic pressure supply system. The hydraulic pressure supply system is comprised of an oil pump 31, a LU hydraulic line LUL for supplying hydraulic pressure to the first and second LU oil chambers 4d and 4e of the above-described LU clutch 4c, a clutch hydraulic line CLL for supplying hydraulic pressure to the FWD oil chamber 12a of the forward clutch 12 and the RVS oil chamber 13a, and a pulley hydraulic line PUL for supplying hydraulic pressure to the DR oil chamber 22c and the DN oil chamber 23c of the continuously variable transmission 6.

The oil pump 31 is a gear pump using the engine 3 as a motive power source, and is connected to the crankshaft 3a. The oil pump 31 is connected to a PH regulating valve (PH REG VLV) 32 via an oil passage, and pumps hydraulic oil stored in a reservoir R to the PH regulating valve 32. The PH regulating valve 32 is formed by a spool valve. During operation of the oil pump 31, the PH regulating valve 32 supplies hydraulic pressure from the oil pump 31, in a regulated state, to the above-mentioned LU hydraulic line LUL, clutch hydraulic line CLL, and pulley hydraulic line PUL.

The clutch hydraulic line CLL is comprised of a branch oil passage 41, a pressure reducing valve 42, a CL main oil passage 43, a hydraulic pressure control valve (LS-CPC) SV, and a manual valve (MAN VLV) 44. The branch oil passage 41 has one end thereof connected to a PU main oil passage 51, and the other end thereof connected to the pressure reducing valve 42. The PU main oil passage 51 is connected to the PH regulating valve 32, and during operation of the oil pump 31, hydraulic pressure from the PH regulating valve 32 is supplied to the pressure reducing valve 42 via the PU main oil passage 51 and the branch oil passage 41.

The pressure reducing valve 42 is formed by a spool valve, and is connected to the manual valve 44 via the CL main oil passage 43. The hydraulic pressure control valve SV is provided in an intermediate portion of the CL main oil passage 43. The hydraulic pressure control valve SV is formed by a linear solenoid valve. During operation of the oil pump 31, hydraulic pressure supplied from the PH regulating valve 32 to the pressure reducing valve 42 is supplied, in a state reduced by the pressure reducing valve 42 and further regulated by the hydraulic pressure control valve SV, to the manual valve 44 via the CL main oil passage 43.

The manual valve 44 is formed by a spool valve, and is connected to the FWD oil chamber 12a and the RVS oil chamber 13a via oil passages. Further, when the shift position of a shift lever (not shown) operated by a driver of the vehicle is at a drive (D), a low (L), or a second (2), the manual valve 44 selects the FWD oil chamber 12*a* as a supply destination of hydraulic pressure from the hydraulic pressure control valve SV, whereas when the shift position is at a reverse (R), the manual valve 44 selects the RVS oil chamber 13*a* as the supply destination of the same. This causes the above-described forward/backward travel-switching mechanism 5 to perform switching of the direction of rotation of the driving force. In this case, by changing an opening of the hydraulic pressure control valve SV, the hydraulic pressure supplied to the FWD oil chamber 12*a* or the RVS oil chamber 13*a* is regulated, whereby the degree of engagement of the forward clutch 12 or the reverse brake 13 is changed. The opening of the hydraulic pressure control valve SV is controlled by an ECU 2 (see FIG. 3).

Furthermore, the hydraulic pressure supply system is provided with a backup valve (B/U VLV) BV for ensuring the supply of hydraulic pressure to the forward clutch 12 and the reverse brake 13 when the hydraulic pressure control valve SV is in failure. The backup valve BV is provided at a portion of the above-mentioned CL main oil passage 43 closer to the manual valve 44 than to the hydraulic pressure control valve SV, and is connected to the pressure reducing valve 42 via an oil passage OL provided in parallel with the CL main oil passage 43.

Figure 4:
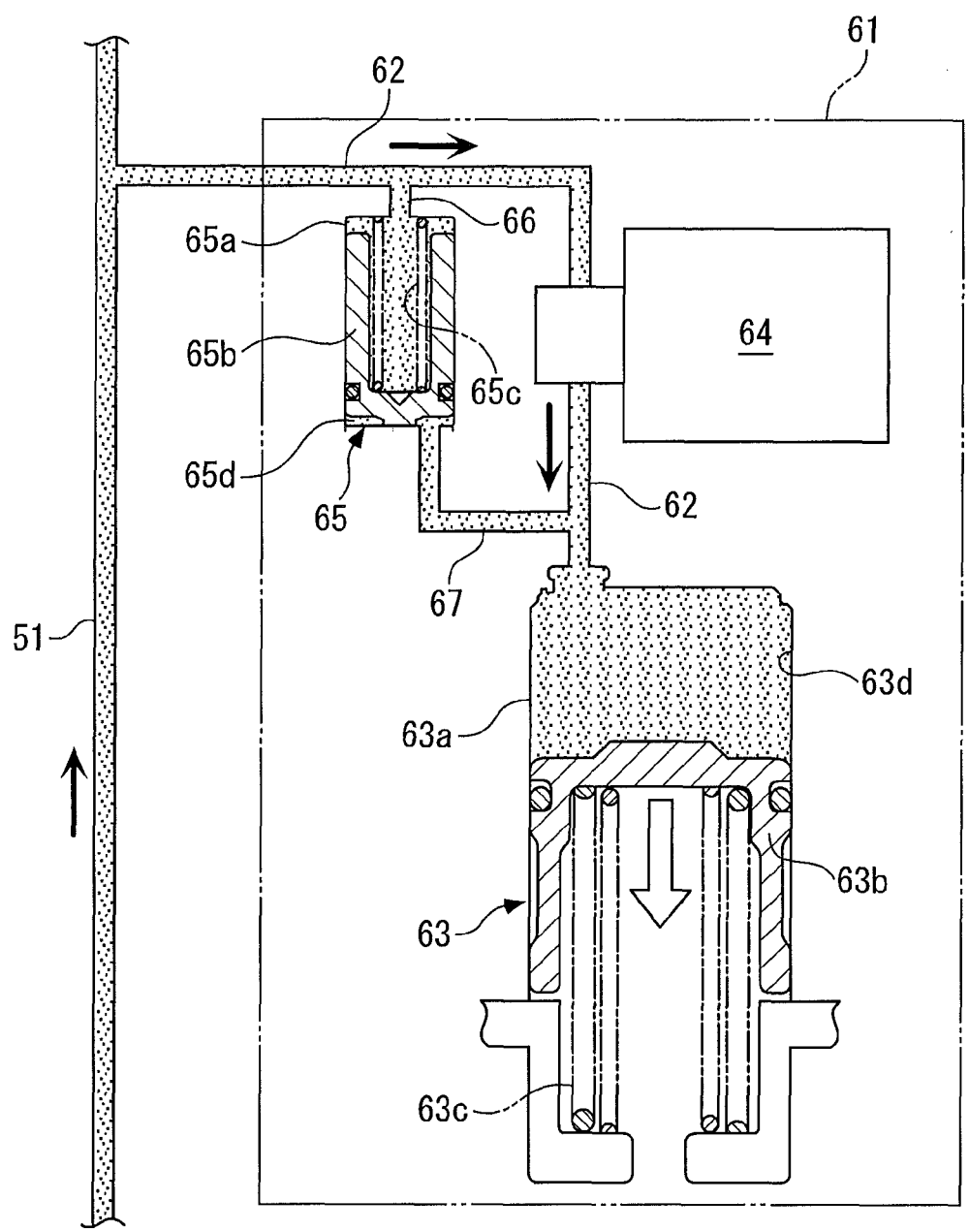
FIG. 4 A diagram schematically showing a pressure accumulator and others during operation of an oil pump.

Further, the hydraulic pressure supply system is equipped with a pressure accumulator 61. As shown in FIG. 4, the pressure accumulator 61 is comprised of a subline 62, a first accumulator 63, a shutoff valve 64, and a second accumulator 65. The subline 62 has one end thereof connected to a portion of the above-mentioned PU main oil passage 51 downstream of a portion of the same connected to the branch oil passage 41, and the other end thereof connected to the first accumulator 63.

The first accumulator 63 includes a cylinder 63*a*, a piston 63*b* slidably provided within the cylinder 63*a*, and a spring 63*c* formed by a compression coil spring. A pressure accumulation chamber 63*d* is defined between the cylinder 63*a* and the piston 63*b*, and the piston 63*b* is urged by the spring 63*c* toward the pressure accumulation chamber 63*d*. The above-mentioned subline 62 communicates with the pressure accumulation chamber 63*d*. The urging force (spring constant) of the spring 63*c* is set such that hydraulic pressure accumulated in the pressure accumulation chamber 63*d* becomes e.g. 0.3 to 0.5 MPa.

The shutoff valve 64 is formed by a solenoid valve of an ON/OFF type, and is provided at an intermediate portion of the subline 62. The shutoff valve 64 is opened and closed by the ECU 2 (see FIG. 3), whereby the subline 62 is opened and closed.

The second accumulator 65 is smaller in size than the first accumulator 63, and includes a cylinder 65*a*, a piston 65*b* slidably provided within the cylinder 65*a*, and a spring 65*c* formed by a compression coil spring. A pressure accumulation chamber 65*d* is defined by the cylinder 65*a* and one end face of the piston 65*b*, and the piston 65*b* is urged by the spring 65*c* toward the pressure accumulation chamber 65*d*. The setting of the urging force (spring constant) of the spring 65*c* will be described hereinafter.

Further, the second accumulator 65 is connected to the subline 62 in a manner bypassing the shutoff valve 64 via a first oil passage 66 and a second oil passage 67. During operation of the oil pump 31, hydraulic pressure from the PU main oil passage 51 acts on the other end face of the piston 65*b* (end face opposite to the pressure accumulation chamber 65*d*) as back pressure via the subline 62 and the first oil passage 66. Further, the pressure accumulation chamber 65*d* of the second accumulator 65 communicates with the pressure accumulation chamber 63*d* of the first accumulator 63 via the second oil passage 67 and the subline 62.

Figure 5:
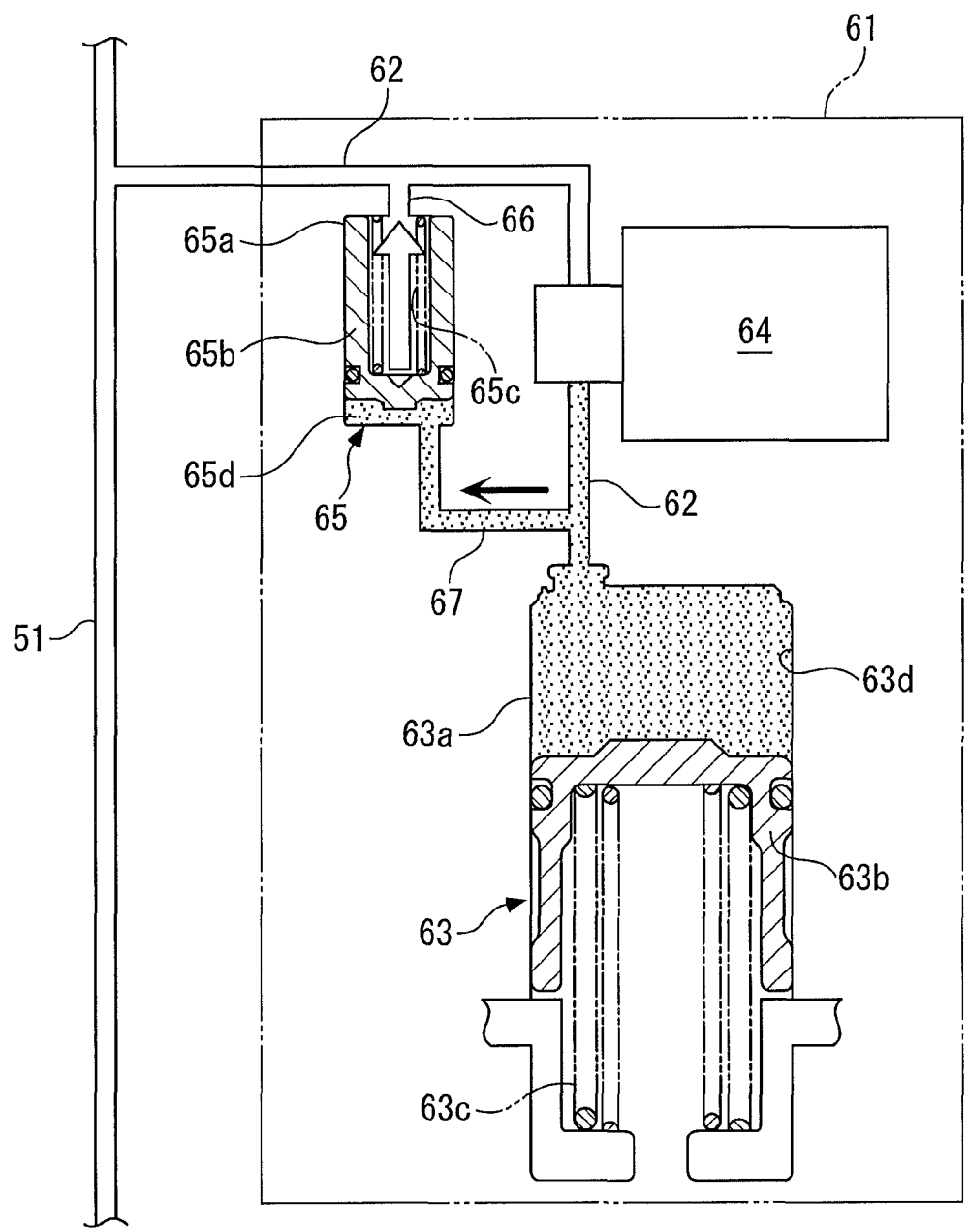
FIG. 5 A diagram schematically showing the pressure accumulator and others when stop conditions of an engine are satisfied.
Figure 6:
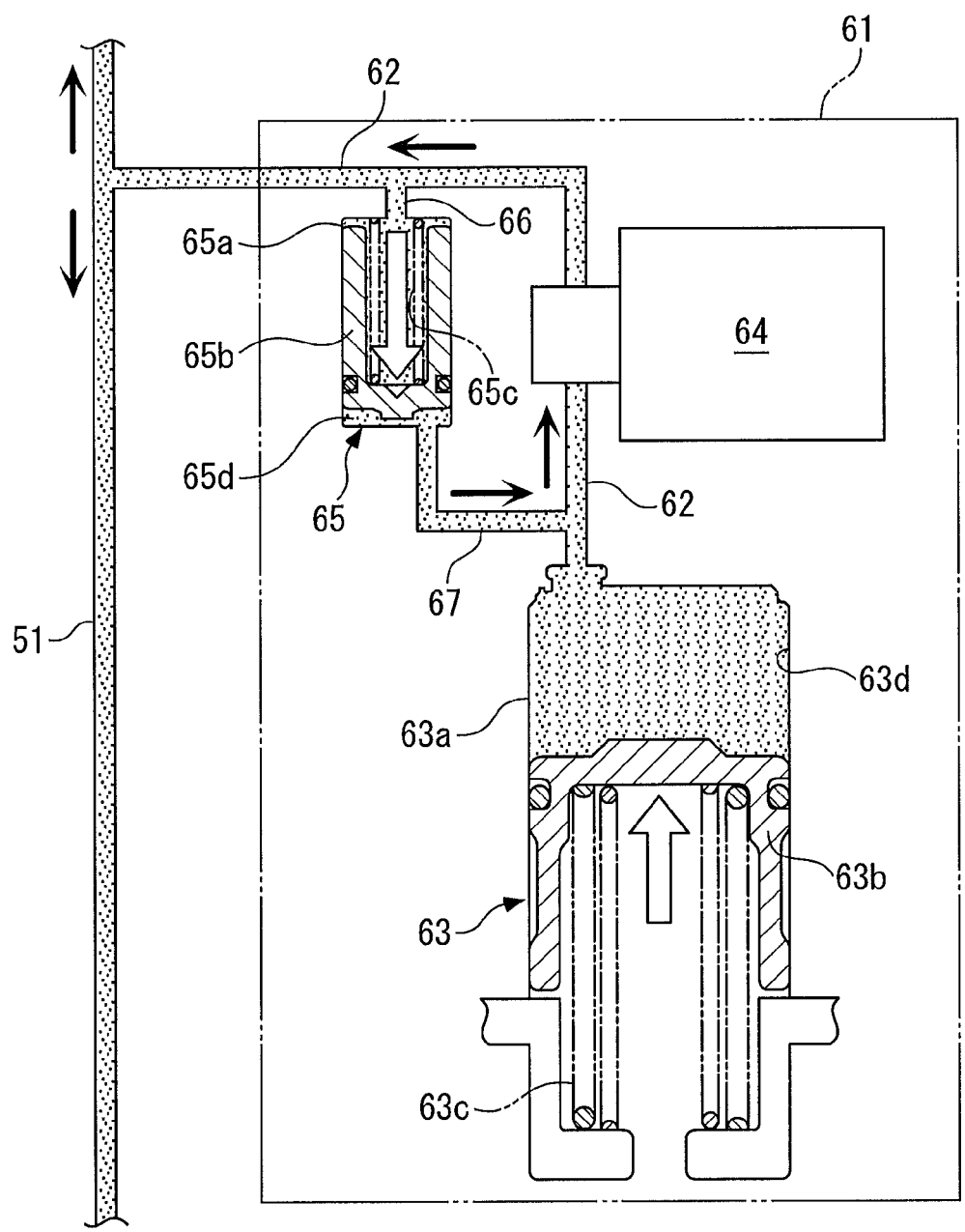
FIG. 6 A diagram schematically showing the pressure accumulator and others when restart conditions of the engine are satisfied.

Hereafter, a description will be given of the operations of the pressure accumulator 61 with reference to FIGS. 4 to 6. FIG. 4 provides an illustration of a case of during operation of the oil pump 31, FIG. 5 provides an illustration of a case where predetermined stop conditions of the engine 3, described hereinafter, are satisfied, and FIG. 6 provides an illustration of a case where predetermined restart conditions of the engine 3, described hereinafter, are satisfied. Note that in FIGS. 4 to 6, the hydraulic oil of the hydraulic pressure supply system is indicated by stippling, and a flowing direction of the hydraulic oil is indicated by an arrowed thick solid line.

[During Operation of the Oil Pump 31]

During operation of the oil pump 31, the shutoff valve 64 is held in a valve open state, whereby the subline 62 is held in an open state. This causes hydraulic pressure from the PU main oil passage 51 to be supplied to the pressure accumulation chamber 63*d* of the first accumulator 63 via the subline 62 to press the piston 63*b*. This causes the piston 63*b* to move toward a side opposite to the pressure accumulation chamber 63*d* against the urging force of the spring 63*c* (indicated by a hollow arrow in FIG. 4), whereby hydraulic pressure supplied from the PU main oil passage 51 is accumulated in the first accumulator 63.

Further, hydraulic pressure from the PU main oil passage 51 acts on the other end face of the piston 65*b* of the second accumulator 65 (end face opposite to the pressure accumulation chamber 65*d*) as back pressure, via the subline 62 and the first oil passage 66. The urging force of the spring 65*c* is set such that during operation of the oil pump 31, the sum of the urging force of the spring 65*c* and the above-mentioned back pressure becomes larger than hydraulic pressure in the circuit including the subline 62, the first accumulator 63, and the second oil passage 67. This makes it possible to properly accumulate hydraulic pressure from the oil pump 31 in the first accumulator 63 with very little accumulation in the second accumulator 65, as shown in FIG. 4, during operation of the oil pump 31.

[When Stop Conditions of the Engine 3 are Satisfied]

When stop conditions of the engine 3 are satisfied, the engine 3 is stopped accordingly, so that the oil pump 31 that uses the engine 3 as the motive power source is stopped. In this case, the shutoff valve 64 is held in a valve closed state, whereby the subline 62 is held in a closed state. Therefore, hydraulic pressure that has been accumulated in the first accumulator 63 up to the time is held by disconnecting the PU main oil passage 51 from the first accumulator 63, as shown in FIG. 5. Further, a closed circuit including the subline 62, the first accumulator 63, and the second oil passage 67 is formed by the closing of the shutoff valve 64.

Further, when the oil pump 31 is stopped, the back pressure from the PU main oil passage 51 no longer acts accordingly, so that only the urging force of the spring 65*c* acts as a pressing force for pressing the piston 65*b* of the second accumulator 65 toward the pressure accumulation chamber 65*d*. Further, the pressure accumulation chamber 65*d* of the second accumulator 65 communicates with the pressure accumulation chamber 63*d* of the first accumulator 63 via the second oil passage 67 and the subline 62. From the above, along with the stop of the oil pump 31, the piston 65*b* of the second accumulator 65 is moved toward the side opposite to the pressure accumulation chamber 65*d* by being pressed by hydraulic pressure accumulated in the closed circuit closed by the shutoff valve 64 (indicated by a hollow arrow in FIG. 5). Accordingly, part of hydraulic pressure (hydraulic oil) in the closed circuit is supplied to the pressure accumulation chamber 65d of the second accumulator 65 and is accumulated therein.

As described above, since part of hydraulic pressure in the closed circuit closed by the shutoff valve 64 is accumulated in the second accumulator 65, it is possible to reduce the hydraulic pressure in the closed circuit by an excess amount of pressure. This makes it possible to adopt the shutoff valve that is relatively low in pressure resistance and has a small size. Further, compared with a case where a relief valve is used for reducing the hydraulic pressure in the closed circuit, for example, the second accumulator 65 not only has a function of accumulating hydraulic pressure, but also is difficult to break down, and hence it is possible to enhance the reliability of the hydraulic pressure supply system.

[When Restart Conditions of the Engine 3 are Satisfied]

When restart conditions of the engine 3 are satisfied, the shutoff valve 64 is opened, whereby the subline 62 is opened. Accordingly, as shown in FIG. 6, the piston 63b of the first accumulator 63 is moved toward the pressure accumulation chamber 63d by the urging force of the spring 63c (indicated by a hollow arrow in the figure). This causes the hydraulic pressure accumulated in the above-mentioned closed circuit including the first accumulator 63 to be supplied to the DR oil chamber 22c and the DN oil chamber 23c via the subline 62 and the PU main oil passage 51, and is further supplied to the FWD oil chamber 12a and the RVS oil chamber 13a via the branch oil passage 41 and the CL main oil passage 43.

Then, when the restart of the engine 3 is completed, and the hydraulic pressure of the oil pump 31 rises sufficiently, in addition to the hydraulic pressure from the closed circuit, hydraulic pressure from the oil pump 31 is supplied to the DR oil chamber 22c, the DN oil chamber 23c, the FWD oil chamber 12a, and the RVS oil chamber 13a.

Note that FIG. 6 shows a state immediately after the restart conditions of the engine 3 are satisfied. In this state, the oil pump 31 does not operate yet and the hydraulic pressure in the closed circuit is higher. Therefore, as shown in the figure, in a portion of the PU main oil passage 51 closer to the oil pump 31 than the portion of the same connected to the subline 62 is, hydraulic oil flows toward the oil pump 31.

Further, along with the above-mentioned valve opening of the shutoff valve 64, a pressing force formed by both the back pressure and the urging force of the spring 65c acts again as the pressing force for pressing the piston 65b of the second accumulator 65 toward the pressure accumulation chamber 65d. This causes the piston 65b to move toward the pressure accumulation chamber 65d (indicated by a hollow arrow in FIG. 6), whereby hydraulic pressure (hydraulic oil) accumulated in the second accumulator 65 up to the time is supplied to the FWD oil chamber 12a and others, together with hydraulic pressure from the first accumulator 63, via the second oil passage 67, the subline 62, and the PU main oil passage 51. Therefore, at the restart of the oil pump 31, it is possible to supply the hydraulic pressure (hydraulic oil) that has been accumulated in the second accumulator 65 during stop of the oil pump 31, to the forward clutch 12, without waste.

Further, as described above, when the operation of the oil pump 31 is restarted, it is possible to discharge the hydraulic oil accumulated in the second accumulator 65, and hence it is possible to properly accumulate part of hydraulic pressure in the closed circuit, again, when the oil pump 31 is stopped. Therefore, although the operation and stop of the oil pump 31 are repeatedly performed, it is possible to effectively obtain the above-described advantageous effect.

Figure 3:
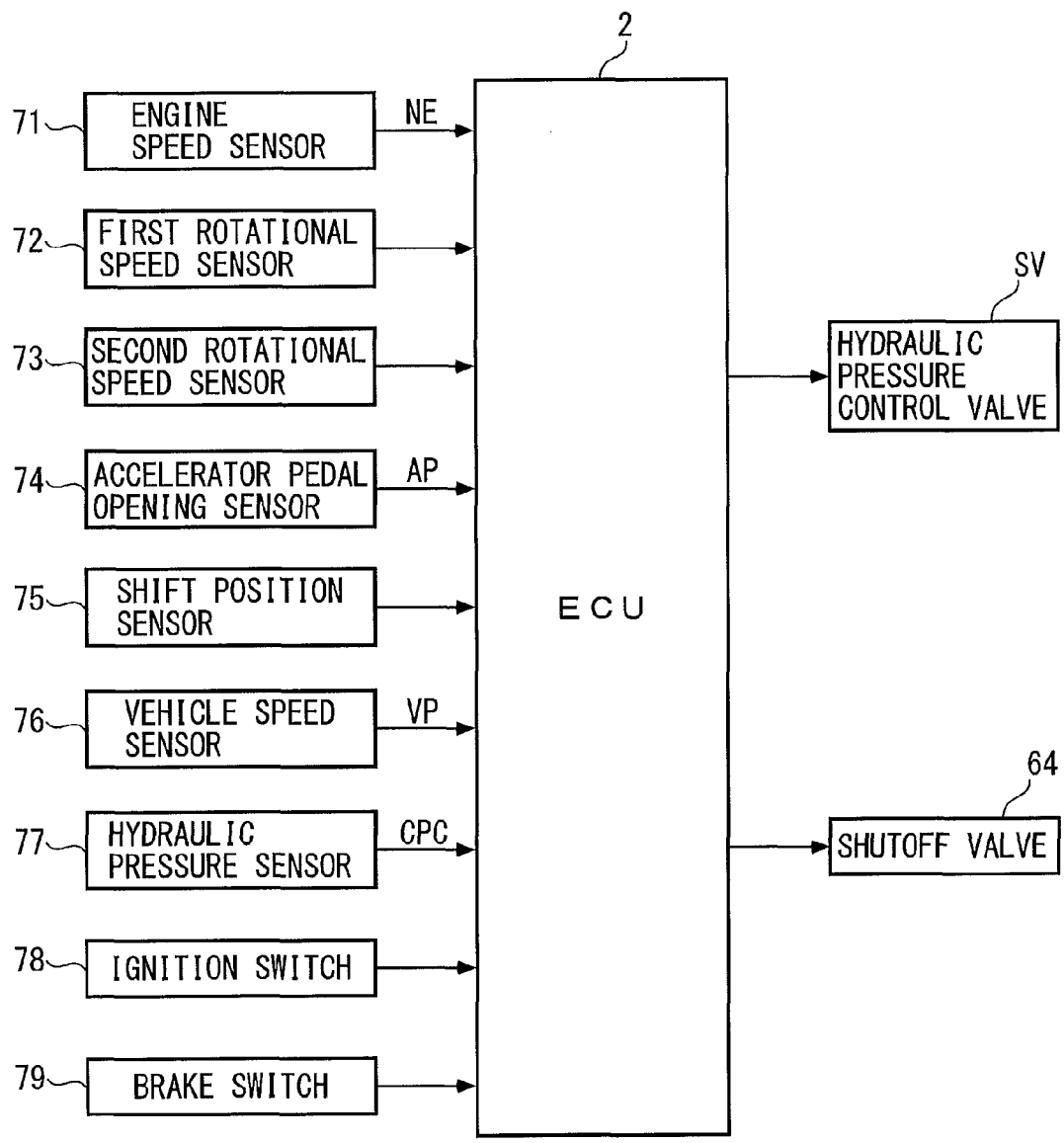
FIG. 3 A block diagram showing an ECU and others.

Further, as shown in FIG. 3, a detection signal indicative of a rotational speed NE of the engine 3 is delivered from an engine speed sensor 71 to the ECU 2. Furthermore, to the ECU 2, a detection signal indicative of a rotational speed of the input shaft 14 is delivered from a first rotational speed sensor 72 and a detection signal indicative of a rotational speed of the main shaft 21 is delivered from a second rotational speed sensor 73. The ECU 2 calculates a rotational difference parameter DN as a difference between the detected rotational speed of the main shaft 21 and the detected rotational speed of the input shaft 14 (rotational speed of the main shaft 21−rotational speed of the input shaft 14).

Furthermore, to the ECU 2, a detection signal indicative of an operation amount of an accelerator pedal (not shown) of the vehicle (hereinafter referred to as the "accelerator pedal opening") AP is delivered from an accelerator pedal opening sensor 74, a detection signal indicative of a shift position (L, 2, D, N, R, P) of the shift lever is delivered from a shift position sensor 75, and a detection signal indicative of a vehicle speed VP is delivered from a vehicle speed sensor 76. Further, a detection signal indicative of hydraulic pressure in the FWD oil chamber 12a of the forward clutch 12 (hereinafter referred to as "the clutch hydraulic pressure") CPC is delivered from a hydraulic pressure sensor 77 to the ECU 2.

Furthermore, a detection signal indicative of an ON/OFF state of an ignition switch 78 is delivered therefrom to the ECU 2, and a detection signal indicative of an ON/OFF state (state of stepping-on/releasing) of a brake pedal (not shown) of the vehicle is delivered from a brake switch 79 to the ECU 2.

The ECU 2 is implemented by a microcomputer comprised of an I/O interface, a CPU, a RAM, and a ROM. The ECU 2 controls the engine 3, the hydraulic pressure control valve SV, and the shutoff valve 64, in response to the detection signals from the aforementioned sensors 71 to 77 and the aforementioned switches 78 and 79, according to control programs stored in the ROM.

Specifically, the ECU 2 automatically stops the engine 3 when the stop conditions of the engine 3 are satisfied. In accordance therewith, the oil pump 31 that uses the engine 3 as the motive power source is stopped, and the supply of hydraulic pressure to the FWD oil chamber 12a of the forward clutch 12 is stopped, whereby, as described above, the forward clutch 12 is placed in the released state and the hydraulic oil filled in the FWD oil chamber 12a is discharged.

The above-mentioned stop conditions include the following conditions (a) to (e):
(a) The ignition switch 78 is in an on position.
(b) The vehicle speed VP is not higher than a predetermined stop vehicle speed VPSTP.
(c) The accelerator pedal opening AP is equal to 0.
(d) The shift position is other than P, R, and N.
(e) The brake switch 79 is in an on position.
The stop vehicle speed VPSTP of the condition (b) is set to a predetermined value that is larger than 0, e.g. 10 km/h.

During automatic stop of the engine 3, when the driver releases the brake pedal to thereby cause the predetermined restart conditions, including the OFF state of the brake switch 79, to be satisfied, the engine 3 is restarted e.g. by driving the above-mentioned starter, and along therewith, the operation of the oil pump 31 is restarted.

Figure 7:
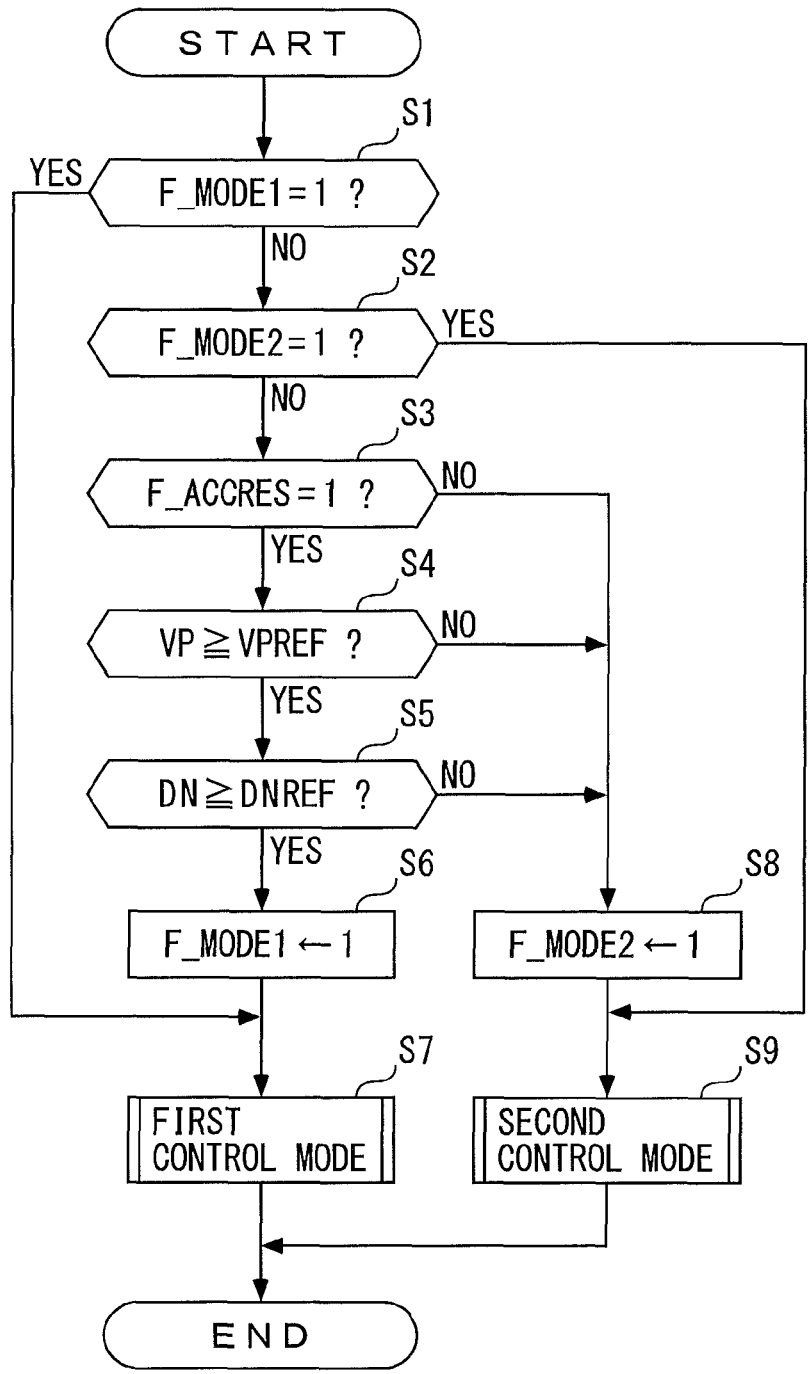
FIG. 7 A flowchart of a hydraulic pressure control process that is performed by the ECU.

Next, a description will be given of a hydraulic pressure control process performed by the ECU 2 with reference to FIG. 7. The present process is for controlling hydraulic pressure that is supplied from the above-mentioned pressure accumulator 61 to the forward clutch 12 (hereinafter referred to as "the clutch supply hydraulic pressure") when the above-described restart conditions are satisfied. The process is started when the restart conditions are satisfied, and are repeatedly performed whenever a predetermined time period (e.g. 10 msec) elapses. Further, when the restart of the engine 3 is completed (complete combustion of the engine 3), the present process is not performed thereafter until the engine 3 is automatically stopped again and the restart conditions are satisfied.

First, in a step 1 ((shown as "S1"; the same applies hereafter) and in a step 2, it is determined whether or not a first control mode flag F_MODE1 and a second control mode flag F_MODE2 are equal to 1, respectively. The first control mode flag F_MODE1 indicates that a first control mode, referred to hereinafter, is being performed, and the second control mode flag F_MODE2 indicates that a second control mode, referred to hereinafter, is being performed, by "1", respectively.

If both of the answers to the questions of steps 1 and 2 are NO, it is determined whether or not a re-acceleration flag F_ACCRES is equal to 1 (step 3). This re-acceleration flag F_ACCRES is set to 1 when the restart conditions are satisfied during traveling of the vehicle V and also the driver requests acceleration when the restart conditions are satisfied. In this case, when the brake switch 79 is switched from on to off, it is determined that the driver has requested acceleration.

If the answer to the question of the step 3 is YES (F_ACCRES=1), i.e. if the driver requests acceleration when the restart conditions are satisfied, it is determined whether or not the detected vehicle speed VP is not lower than a predetermined vehicle speed VPREF (step 4). The vehicle speed VP that is used for the determination of the step 4 is detected when the restart conditions are satisfied. The reason for this will be described hereinafter.

If the answer to the question of the step 4 is YES, i.e. if the vehicle speed VP ≥the predetermined vehicle speed VPREF holds, it is determined whether or not the calculated rotational difference parameter DN is not smaller than a predetermined value DNREF (step 5). The rotational difference parameter DN that is used for the determination of the step 5 is calculated when the restart conditions are satisfied. The reason for this will be described hereinafter.

Further, the predetermined vehicle speed VPREF and the predetermined value DNREF are set to such values that in a case where both the determinations of the above steps 4 and 5 (VP≥VPREF, DN≥DNREF) are affirmative, if connection between the engine 3 and the drive wheels DW is hastily performed by the forward clutch 12, a shock would be caused.

If the answer to the question of the step 5 is YES, i.e. if rotational difference parameter DN predetermined value DNREF holds, the first control mode flag F_MODE1 is set to 1 in order to perform the first control mode as a control mode for controlling the clutch supply hydraulic pressure (step 6). Next, the first control mode is performed (step 7), followed by terminating the present process. Further, by performing the above-mentioned step 6, the answer to the question of the above-mentioned step 1 becomes YES (F_MODE1=1). In this case, the steps 2 to 6 are skipped, and the step 7 is performed.

On the other hand, if any one of the answers to the questions of the above-mentioned steps 3 to 5 is NO (F_ACCRES=0, VP<VPREF, or DN<DNREF), the second control mode flag F_MODE2 is set to 1 in order to perform the second control mode as the control mode for controlling the clutch supply hydraulic pressure (step 8). Next, the second control mode is performed (step 9), followed by terminating the present process. Further, by performing the above-mentioned step 8, the answer to the question of the above-mentioned step 2 becomes YES (F_MODE2=1). In this case, the above-mentioned steps 3 to 5 and the step 8 are skipped, and the step 9 is performed.

As described above, the present process is started when the restart conditions are satisfied, and after the first or second control mode is started according to execution of the steps 6 to 9, the steps 4 and 5 are skipped by the above-mentioned step 1 or 2. Further, when the first or second control mode is terminated as described hereinafter, the present process is not performed thereafter unless the engine 3 is automatically stopped and the restart conditions are satisfied again. As is clear from the above, the steps 4 and 5 are performed only in a first loop at the start of the present process, and hence the vehicle speed VP and the rotational difference parameter DN used in the respective steps 4 and 5 represent the vehicle speed VP and the rotational difference parameter DN detected when the restart conditions are satisfied.

Figure 8:
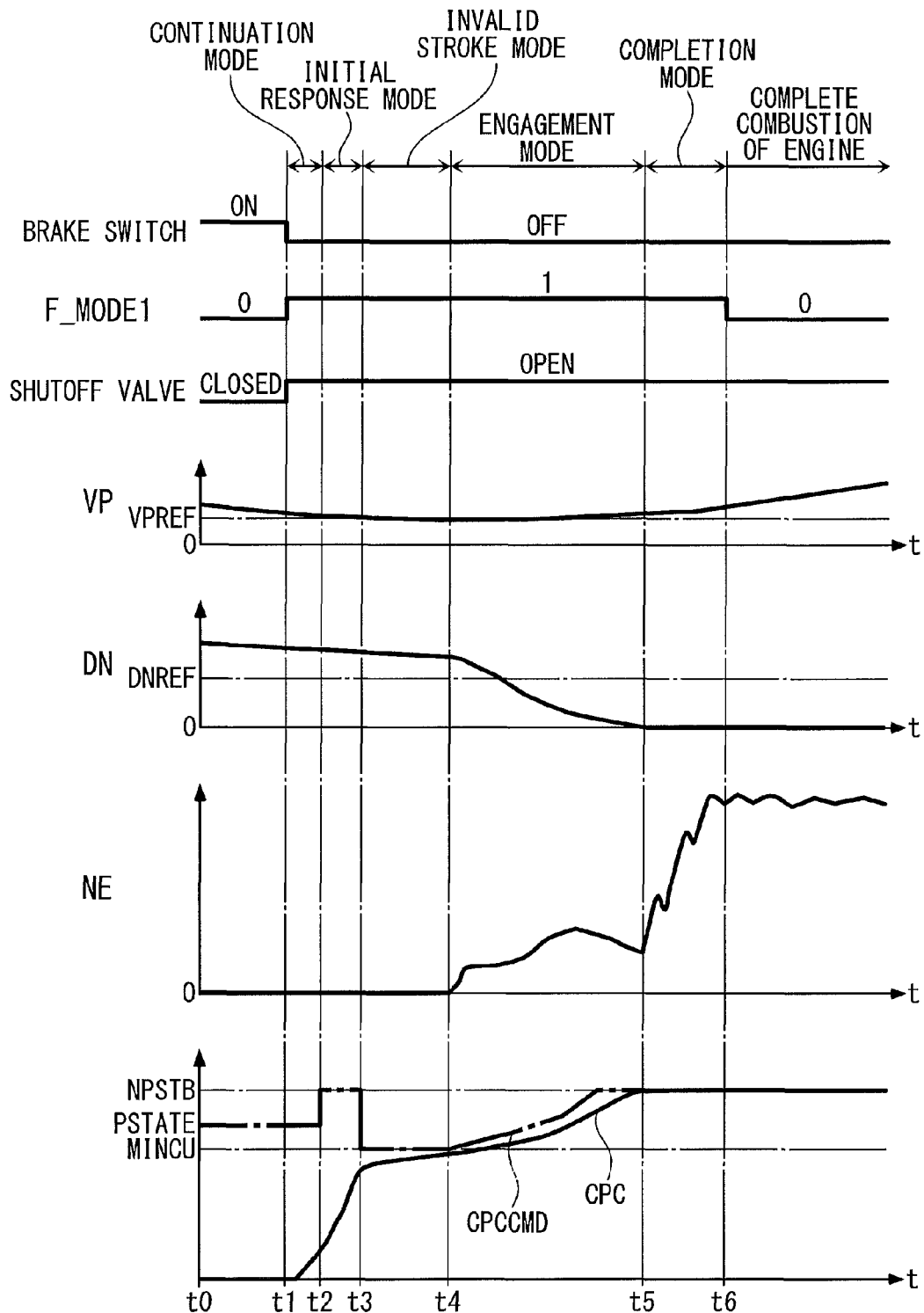
FIG. 8 A timing diagram showing an example of operation of the hydraulic pressure supply system in a first control mode.

Next, descriptions will be given of the first and second control modes with reference to FIGS. 8 and 9, respectively. FIG. 8 shows an example of operation of the hydraulic pressure supply system in a case where after the engine 3 is automatically stopped, restart conditions are satisfied, and the first control mode is performed. As shown in FIG. 8, and as described above with reference to FIG. 5, during automatic stop of the engine 3 (from time point t0), the shutoff valve 64 is held in the valve closed state, and hydraulic pressure accumulated in the first accumulator 63 is held.

Further, during automatic stop of the engine 3, a target clutch hydraulic pressure CPCCMD (indicated by a one-dot-chain line) which is a target value of the clutch hydraulic pressure CPC (hydraulic pressure of the FWD oil chamber 12a of the forward clutch 12) is set to a predetermined standby pressure PSTATE, and is held. The above-mentioned opening of the hydraulic pressure control valve SV for controlling the clutch supply hydraulic pressure (hydraulic pressure supplied to the forward clutch 12) is controlled to a magnitude associated with the target clutch hydraulic pressure CPCCMD. This is for quickly supplying the hydraulic pressure accumulated in the first accumulator 63 and others to the forward clutch 12 when the restart conditions of the engine 3 are subsequently satisfied.

Then, when the brake switch 79, which has been in an on state, is turned off (time point t1), causing the restart conditions of the engine 3 to be satisfied, the above-described hydraulic pressure control process (FIG. 7) is started, and a drive signal for driving the starter is delivered to the starter. The driving of the crank shaft 3a by the starter according to the driving signal is performed with a certain delay due to power charge of the starter and response delay of the starter.

Further, when the re-acceleration flag F_ACCRES is equal to 1 (step 3: YES), the vehicle speed VP when the restart conditions are satisfied is not lower than the predetermined vehicle speed VPREF (step 4: YES), and the rotational difference parameter DN when the restart conditions are satisfied is not smaller than the predetermined value DNREF (step 5: YES), the first control mode flag F_MODE1 is set to 1 (step 6) and the first control mode (step 7) is performed.

When the first control mode is started, the shutoff valve 64, which has been in the valve closed state, is opened, whereby the hydraulic pressure accumulated in the first accumulator 63 and others is supplied to the forward clutch 12, as described above with reference to FIG. 6. During the first control mode, by adjusting the opening of the hydraulic pressure control valve SV according to the target clutch hydraulic pressure CPCCMD, the clutch supply hydraulic pressure, which is supplied to the forward clutch 12, is controlled as follows.

The first control mode is comprised of a continuation mode, an initial response mode, an invalid stroke mode, an engagement mode, and a completion mode, as shown in FIG. 8. These control modes are performed in the mentioned order.

The continuation mode, the initial response mode, and the invalid stroke mode are control modes for filling the FWD oil chamber 12a of the forward clutch 12 with hydraulic oil. During the continuation mode (from time point t1), the target clutch hydraulic pressure CPCCMD is set to the standby pressure PSTATE similarly to the time of automatic stop of the engine 3. This causes the opening of the hydraulic pressure control valve SV to be adjusted, whereby the clutch supply hydraulic pressure is increased, so that the clutch hydraulic pressure CPC is gently increased. The continuation mode is performed during time after the restart conditions are satisfied until a battery (not shown) for driving the starter is charged.

During the initial response mode (from time point t2), the target clutch hydraulic pressure CPCCMD is set to a predetermined initial response pressure NPSTB, which is larger than the standby pressure PSTATE. This changes the opening of the hydraulic pressure control valve SV to a larger value than in the continuation mode, whereby the clutch supply hydraulic pressure is more increased, so that the clutch hydraulic pressure CPC is rapidly increased with a larger slope than in the continuation mode. The above initial response mode makes it possible to quickly fill the FWD oil chamber 12a with hydraulic oil. Further, the initial response mode is performed for a very short predetermined time period.

During the invalid stroke mode (from time point t3), the target clutch hydraulic pressure CPCCMD is set to a predetermined invalid stroke pressure MINCU, which is smaller than the standby pressure PSTATE. The invalid stroke pressure MINCU is set to a clutch hydraulic pressure CPC, e.g. 0.18 MPa, when the FWD oil chamber 12a is fully filled with hydraulic oil. If the clutch hydraulic pressure CPC is equal to the invalid stroke pressure MINCU, the forward clutch 12 is not engaged yet, which means that the degree of engagement is equal to 0 and the forward clutch 12 disconnects between the engine 3 and the drive wheels DW.

Further, the opening of the hydraulic pressure control valve SV is adjusted by setting the above-mentioned target clutch hydraulic pressure CPCCMD, whereby the clutch supply hydraulic pressure is more reduced than in the continuation mode, so that the clutch hydraulic pressure CPC is gently increased with a smaller slope than in the continuation mode. The above invalid stroke mode makes it possible to prevent the degree of engagement of the forward clutch 12 from being erroneously increased. Further, the invalid stroke mode is performed until the drive of the crank shaft 3a is started by the starter.

The engagement mode is a control mode for further supplying hydraulic pressure to the FWD oil chamber 12a in a filled state, to thereby cause the forward clutch 12 to be fully engaged. During the engagement mode (from time point t4), the target clutch hydraulic pressure CPCCMD is set to a slightly larger value than the detected clutch hydraulic pressure CPC. This causes the opening of the hydraulic pressure control valve SV to be gradually increased, whereby the clutch supply hydraulic pressure is also gradually increased, so that the clutch hydraulic pressure CPC is gently increased, similarly to the invalid stroke mode.

Further, the engagement mode is terminated when initial combustion of one of the cylinders of the engine 3 is performed (time point t5), and the target clutch hydraulic pressure CPCCMD is gradually increased such that the clutch hydraulic pressure CPC is converged to the initial response pressure NPSTB, by the end of the engagement mode. This causes the forward clutch 12 to be fully engaged before the initial combustion of the engine 3 occurs (time point t5).

The completion mode is a control mode for holding the forward clutch 12 in a fully engaged state. During the completion mode (time point t5 to time point t6), the target clutch hydraulic pressure CPCCMD is set according to a torque that is input to the forward clutch 12. In the illustrated example of operation, the target clutch hydraulic pressure CPCCMD is held at the initial response pressure NPSTB. This causes the clutch supply hydraulic pressure to be controlled by way of the opening of the hydraulic pressure control valve SV, whereby the clutch hydraulic pressure CPC is held at the initial response pressure NPSTB, so that the forward clutch 12 is held in the engaged state. The completion mode is started when the initial combustion of one of the cylinders of the engine 3 is performed, and is terminated when the complete combustion of the engine 3 is performed.

Further, when the first control mode is completed, the first control mode flag F_MODE1 is reset to 0. Further, when the above-described stop conditions are satisfied during the first control mode as well, the first control mode flag F_MODE1 is reset to 0.

Figure 9:
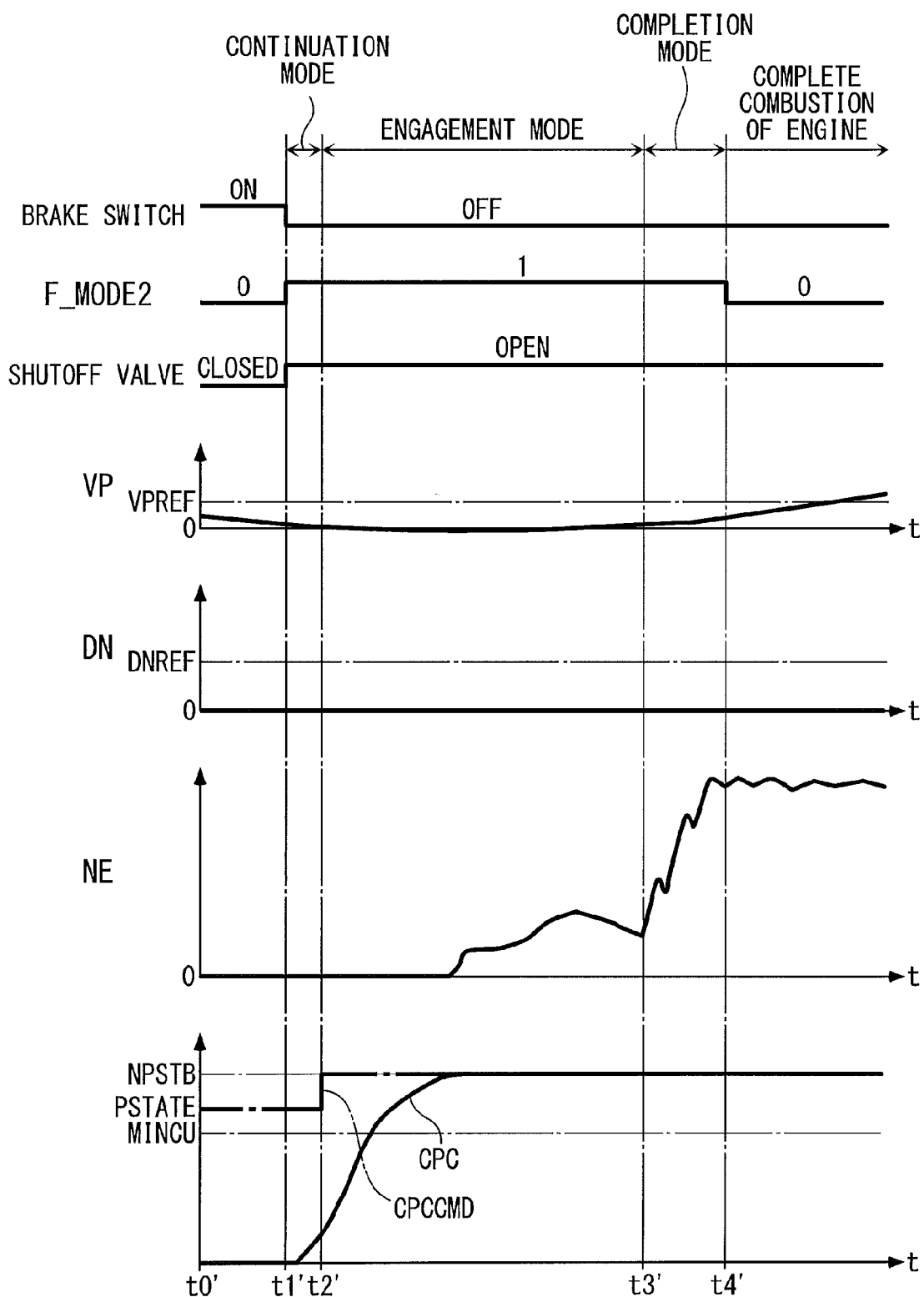
FIG. 9 A timing diagram showing an example of operation of the hydraulic pressure supply system in a second control mode.

Further, FIG. 9 shows an example of operation in a case where after the engine 3 is automatically stopped, restart conditions are satisfied, and the second control mode is performed. During the second control mode, similarly to the case of the first control mode, the clutch supply hydraulic pressure is controlled by adjusting the opening of the hydraulic pressure control valve SV according to the target clutch hydraulic pressure CPCCMD. The second control mode is, differently from the first control mode, comprised of a continuation mode, an engagement mode, and a completion mode. These control modes are performed in the mentioned order. Operations during automatic stop of the engine 3 (from time point t0'), during the continuation mode (from time point t1'), and during the completion mode (from time point t3' to time point t4') are the same as those in the first control mode, and hence detailed description thereof is omitted.

During the engagement mode of the second control mode (from time point t2'), differently from the engagement mode of the first control mode, the target clutch hydraulic pressure CPCCMD is held at the initial response pressure NPSTB. This causes the opening of the hydraulic pressure control valve SV to be controlled to a larger value, whereby the clutch supply hydraulic pressure is significantly increased, so that the clutch hydraulic pressure CPC is rapidly increased with a larger slope than in the continuation mode and is converged to the initial response pressure NPSTB at a relatively earlier timing. Thereafter, the clutch hydraulic pressure CPC is held at the initial response pressure NPSTB.

As described hereinabove, in the case of the engagement mode of the first control mode, the target clutch hydraulic pressure CPCCMD is gradually increased toward the initial response pressure NPSTB, whereas in the case of the second control mode, the target clutch hydraulic pressure CPCCMD is rapidly increased in a stepwise manner to the initial response pressure NPSTB and is held thereat. This causes the clutch supply hydraulic pressure to be controlled, whereby the clutch hydraulic pressure CPC is more gently increased in the case of the first control mode than in the case of the second control mode, after the clutch hydraulic pressure CPC exceeds the invalid stroke pressure MINCU, i.e. after the FWD oil chamber 12a is fully filled with hydraulic oil (see FIGS. 8 and 9). In other words, the degree of engagement of the forward clutch 12 is more gently increased in the case of the first control mode than in the case of the second control mode. This is apparent from comparison between changes in the clutch hydraulic pressure CPC in FIGS. 8 and 9.

Further, when the second control mode is completed, the second control mode flag F_MODE2 is reset to 0. Further, when the above-described stop conditions are satisfied during the second control mode as well, the second control mode flag F_MODE2 is reset to 0.

Further, when the initial combustion of the engine 3 is performed and the operation of the oil pump 31 is restarted, the opening of the hydraulic pressure control valve SV is controlled according to the target clutch hydraulic pressure CPCCMD, which is set according to operating conditions of the engine 3 and others.

Further, in both of the first and second control modes, after satisfaction of the restart conditions of the engine 3 until complete combustion of the engine 3, the oil pump 31 is not driven by the engine 3, and hence only hydraulic pressure from the pressure accumulator 61 is supplied to the forward clutch 12. The pressure accumulator 61 supplies hydraulic pressure to the forward clutch 12, using the first and second accumulators 63 and 65 as motive power sources, and hence the discharge flow rate of oil is smaller than that of oil from the oil pump 31. Therefore, during the first and second control modes, the opening of the hydraulic pressure control valve SV is controlled to be more increased than in a case where hydraulic pressure is supplied from the oil pump 31 to the forward clutch 12.

Further, correspondence between the various types of elements of the present embodiment and various types of elements of the present invention is as follows: The input shaft 14 and the main shaft 21 of the present embodiment correspond to an input shaft of a clutch and an output shaft of the clutch of the present invention, the oil pump 31 and the pressure accumulator 61 of the present embodiment correspond to first and second hydraulic pressure supply devices of the present invention, and the first and second accumulators 63 and 65 of the present embodiment correspond to a motive power source of the present invention. Further, the ECU 2 and the hydraulic pressure control valve SV of the present embodiment correspond to hydraulic pressure control means of the present invention, and the ECU 2, the vehicle speed sensor 76, and the first and second rotational speed sensors 72 and 73 of the present embodiment correspond to detection means of the present invention. Furthermore, the first and second accumulators 63 and 65 of the present embodiment correspond to an accumulator of the present invention, and the hydraulic pressure control valve SV of the present embodiment corresponds to a linear solenoid valve of the present invention.

As described heretofore, according to the present embodiment, when the restart conditions of the engine 3 are satisfied, it is possible to supply hydraulic pressure to the forward clutch 12, using the pressure accumulator 61 comprised of the first and second accumulators 63 and 65, and hence it is possible to supply hydraulic pressure to the forward clutch 12 even before the restart of the engine 3 is completed. This makes it possible to cause the forward clutch 12 to quickly connect between the engine 3 and the drive wheels DW, whereby it is possible to quickly transmit the driving force of the engine 3 to the drive wheels DW. Therefore, it is possible to quickly start and accelerate the vehicle, and improve its drivability.

Further, the stop conditions of the engine 3 include a condition that the vehicle speed VP is not higher than the predetermined stop vehicle speed VPSTP which is larger than 0, and hence, there is a case, for example, where during traveling of the vehicle, the engine 3 is stopped due to satisfaction of the stop conditions and the engine 3 is restarted due to satisfaction of the restart conditions. According to the present embodiment, in a case where the restart conditions are satisfied, when the detected vehicle speed VP is not lower than the predetermined vehicle speed VPREF and also the detected rotational difference parameter DN is not smaller than the predetermined value DNREF, i.e. when a shock would be caused if connection between the engine 3 and the drive wheels DW is hastily performed by the forward clutch 12, the clutch supply hydraulic pressure is controlled in the first control mode.

Further, in a case where the restart conditions are satisfied, when the detected vehicle speed VP is lower than the predetermined vehicle speed VPREF or the detected rotational difference parameter DN is smaller than the predetermined value DNREF, i.e. when a shock would not be caused by connection between the engine 3 and the drive wheels DW by the forward clutch 12, the clutch supply hydraulic pressure is controlled in the second control mode. Further, as described with reference to FIGS. 8 and 9, when the first control mode is selected, i.e. when a shock would be caused by connection between the engine 3 and the drive wheels DW by the forward clutch 12, the clutch supply hydraulic pressure is controlled such that the degree of engagement of the forward clutch 12 is more gently increased than in the case of the second control mode which is selected when a shock would not be caused. This makes it possible to gently increase the degree of engagement of the forward clutch 12, and hence it is possible to properly suppress a shock caused by the connection using the forward clutch 12 at the restart of the engine 3, and quickly connect between the engine 3 and the drive wheels DW when a shock would not be caused, which in turn improves vehicle drivability.

In this case, it is possible to control the clutch supply hydraulic pressure that is supplied from the pressure accumulator 61 to the forward clutch 12 according to the detected vehicle speed VP and the detected rotational difference parameter DN, and hence it is possible to properly obtain the above-mentioned advantageous effect, i.e. the advantageous effect that vehicle drivability can be improved.

Further, when the engine 3 is automatically stopped during downhill traveling of the vehicle, compared with a case of uphill traveling, the vehicle speed VP is not easily reduced due to gravity, and hence there is a case where the vehicle speed VP is relatively high and the difference in rotational speed between the main shaft 21 and the input shaft 14 is relatively large. Particularly in this case, a large shock would be caused by hasty connection by the forward clutch 12. According to the present embodiment, when the vehicle speed VP is not lower than the predetermined vehicle speed VPREF and also the rotational difference parameter DN is not smaller than the predetermined value DNREF, it is possible to gently increase the degree of engagement of the forward clutch 12, and hence it is possible to properly suppress the shock caused by connection by the forward clutch 12 even in the case of the above-described downhill traveling of the vehicle.

Further, during time after satisfaction of the restart conditions until initial combustion of the engine 3, it is possible to fully engage the forward clutch 12, and hence it is possible to transmit the driving force of the engine 3 to the drive wheels DW immediately after the initial combustion of the engine 3, which in turn makes it possible to further improve vehicle drivability.

Further, in a case where only the hydraulic pressure from the pressure accumulator 61 is supplied to the forward clutch 12, compared with the case where hydraulic pressure is supplied from the oil pump 31 to the forward clutch 12, the opening of the hydraulic pressure control valve SV is controlled to be more increased. With this, it is possible to control the opening of the hydraulic pressure control valve SV to a magnitude appropriate to the amount of oil discharged from the pressure accumulator 61 that uses the first and second accumulators 63 and 65 as motive power sources, and hence it is possible to properly control the supply of hydraulic pressure from the pressure accumulator 61 to the forward clutch 12.

During automatic stop of the engine 3, particularly in a case where the stepping-on of the brake pedal is released by the driver, the driver tends to strongly feel discomfort caused by a shock. According to the present embodiment, when the conditions concerning the vehicle speed VP and the rotational difference parameter DN (steps 4 and 5) are satisfied and also the re-acceleration flag F_ACCRES is equal to 1, i.e. when the driver requests acceleration when the restart conditions are satisfied, the first control mode is selected. This makes it possible to properly suppress the shock caused by connection by the forward clutch 12 when the driver would strongly feel discomfort caused by a shock.

Note that although in the present embodiment, the valve opening timing of the shutoff valve 64 is set to a timing at which the restart conditions are satisfied, i.e. a timing at which the brake switch 79 is turned off, the valve opening timing of the shutoff valve 64 may be set, according to the hydraulic pressure of the brake, to e.g. a timing at which the hydraulic pressure of the brake becomes lower than a predetermined value. With this, by predicting the restart of the engine 3, hydraulic pressure from the pressure accumulator 61 may be supplied to the forward clutch 12 immediately before the brake switch 79 is turned off.

Further, although in the present embodiment, the shutoff valve 64 is formed by the solenoid valve of ON/OFF type, the shutoff valve may be formed by a linear solenoid valve, and in this case, the clutch supply hydraulic pressure may be controlled via the shutoff valve that is formed by the linear solenoid valve, instead of the hydraulic pressure control valve SV. Further, in the hydraulic pressure control process (FIG. 7), the condition of the step 3 (F_ACCRES=1?) may be omitted.

Note that the present invention is by no means limited to the embodiment described above, but can be practiced in various forms. For example, although in the present embodiment, the oil pump 31 that is a gear pump is used as the first hydraulic pressure supply device of the present invention, any other suitable device, e.g. a trochoid pump, may be used. Further, although in the present embodiment, the pressure accumulator 61 that is formed by the first accumulator 63 and so forth is used as the second hydraulic pressure supply device, any other suitable device that is driven by a motive power source other than the engine 3, e.g. an electric pump that uses an electric motor as a motive power source, may be used. In this case, the clutch supply hydraulic pressure may be controlled by controlling the rotational speed of the electric pump instead of controlling the opening of the hydraulic pressure control valve SV. Further, although in the embodiment, the first and second accumulators 63 and 65 are used as the accumulator of the present invention, a single accumulator may be used, or a plurality of accumulators that are connected in parallel or in series to each other may be used.

Further, although in the embodiment, the full engagement of the forward clutch 12 is completed by the time of the initial combustion of the engine 3, the full engagement of the forward clutch 12 may be completed after the complete combustion of the engine 3. In this case, in addition to the hydraulic pressure from the pressure accumulator 61, the hydraulic pressure from the oil pump 31 is also controlled via the hydraulic pressure control valve SV in the first and second control modes. Further, although in the embodiment, the vehicle speed VP and the rotational difference parameter DN that are used for selecting between the first and second control modes are detected at a timing at which the restart conditions of the engine 3 are satisfied, they may be detected at a timing immediately after satisfaction of the restart conditions. Further, although in the embodiment, selection between the first and second control modes is performed according to both the vehicle speed VP and the rotational difference parameter DN, the selection may be performed according to one of the two parameters VP and DN. In this case, only the one of the two parameters may be detected.

Further, although in the embodiment, the clutch supply hydraulic pressure is controlled by selecting between the first and second control modes according to the vehicle speed VP and the rotational difference parameter DN, the clutch supply hydraulic pressure may be controlled, for example, according to at least one of the two parameters such that the degree of engagement of the forward clutch 12 is more gently increased as at least one of the two parameters VP and DN is larger. Further, although in the embodiment, the rotational difference parameter DN is a difference in rotational speed between the main shaft 21 and the input shaft 14, any other suitable parameter that represents the rotational difference between the main shaft 21 and the input shaft 14, e.g. a rotational difference between the input shaft 14 and the main shaft 21, a ratio of the rotational speed of the main shaft 21 to the rotational speed of the input shaft 14, or a reciprocal of the ratio, may be used.

Further, although the embodiment is an example in which the hydraulic pressure supply system according to the present invention is applied to the forward clutch 12, but it can be applied to a hydraulic clutch of any other type that connects and disconnects between the engine 3 and the drive wheels DW, e.g. to the reverse brake 13. Further, it is to be understood that the above-described variations may be suitably combined. Further, it is possible to suitably alter or modify details of the arrangement without departing from the spirit and scope of the present invention.

INDUSTRIAL APPLICABILITY

The hydraulic pressure supply system according to the present invention is very useful in properly controlling a degree of engagement of a clutch at restart of an internal combustion engine to thereby improve vehicle drivability.

REFERENCE SIGNS LIST

DW drive wheels
2 ECU (detection means, hydraulic pressure control means)
3 engine
12 forward clutch
14 input shaft (input shaft of clutch)
21 main shaft (output shaft of clutch)
31 oil pump (first hydraulic pressure supply device)
SV hydraulic pressure control valve (hydraulic pressure control means, linear solenoid valve)
61 pressure accumulator (second hydraulic pressure supply device)
63 first accumulator (motive power source, accumulator)
65 second accumulator (motive power source, accumulator)
72 first engine speed sensor (detection means)
73 second engine speed sensor (detection means)
76 vehicle speed sensor (detection means)
DN rotational speed difference parameter
VP vehicle speed
VPREF predetermined vehicle speed
DNREF predetermined value

The invention claimed is:

1. A hydraulic pressure supply system for supplying hydraulic pressure to a hydraulic clutch which connects and disconnects between an internal combustion engine that is installed on a vehicle as a motive power source and is stopped when predetermined stop conditions are satisfied and restarted when predetermined restart conditions are satisfied, by a starter device that is not used as a motive power source of the vehicle, and drive wheels of the vehicle,
wherein the stop conditions include a condition that a speed of the vehicle is not higher than a predetermined stop vehicle speed which is larger than 0,
the hydraulic pressure supply system comprising:
a first hydraulic pressure supply device that uses the engine as a motive power source, and supplies hydraulic pressure to the clutch;
a second hydraulic pressure supply device that supplies hydraulic pressure to the clutch by being driven by a motive power source other than the engine;
detection means for detecting at least one of the speed of the vehicle and a rotational difference parameter indicative of a difference in rotational speed between an output shaft of the clutch and an input shaft of the clutch; and
hydraulic pressure control means for controlling clutch supply hydraulic pressure which is hydraulic pressure supplied to the clutch, according to at least one of the vehicle speed and the rotational difference parameter, by said detection means, when the restart conditions of the engine have been satisfied.

2. The hydraulic pressure supply system according to claim 1, wherein said hydraulic pressure control means controls the clutch supply hydraulic pressure in a first control mode, when the vehicle speed is not lower than a predetermined vehicle speed and also the difference in rotational speed between the output shaft and the input shaft, which is represented by the rotational difference parameter, is not smaller than a predetermined value, and
controls the clutch supply hydraulic pressure in a second control mode, when the vehicle speed is lower than the predetermined vehicle speed or the difference in rotational speed between the output shaft and the input shaft, which is represented by the rotational difference parameter, is smaller than the predetermined value, and
wherein the first control mode is a mode for controlling the clutch supply hydraulic pressure such that a degree of engagement of the clutch is increased more gently than in the second control mode.

3. The hydraulic pressure supply system according to claim 2, wherein said hydraulic pressure control means controls the clutch supply hydraulic pressure such that the clutch becomes fully engaged during a time from satisfaction of the restart conditions to initial combustion of the engine.

4. The hydraulic pressure supply system according to claim 2, wherein said hydraulic pressure control means controls hydraulic pressure supplied from the second hydraulic pressure supply device.

5. The hydraulic pressure supply system according to claim 2, wherein the second hydraulic pressure supply device uses an accumulator as a motive power source, and
wherein said hydraulic pressure control means includes a linear solenoid valve for adjusting the clutch supply hydraulic pressure, and in a case where only hydraulic pressure from the second hydraulic pressure supply device is supplied to the clutch, said hydraulic pressure control means controls an opening of the linear solenoid valve to be more increased, compared with a case where hydraulic pressure is supplied from the first hydraulic pressure supply device to the clutch.

6. The hydraulic pressure supply system according to claim 1, wherein said hydraulic pressure control means controls the clutch supply hydraulic pressure such that the clutch becomes fully engaged during a time from satisfaction of the restart conditions to initial combustion of the engine.

7. The hydraulic pressure supply system according to claim 6, wherein said hydraulic pressure control means controls hydraulic pressure supplied from the second hydraulic pressure supply device.

8. The hydraulic pressure supply system according to claim 6, wherein the second hydraulic pressure supply device uses an accumulator as a motive power source, and
wherein said hydraulic pressure control means includes a linear solenoid valve for adjusting the clutch supply hydraulic pressure, and in a case where only hydraulic pressure from the second hydraulic pressure supply device is supplied to the clutch, said hydraulic pressure control means controls an opening of the linear solenoid valve to be more increased, compared with a case where hydraulic pressure is supplied from the first hydraulic pressure supply device to the clutch.

9. The hydraulic pressure supply system according to claim 1, wherein said hydraulic pressure control means controls hydraulic pressure supplied from the second hydraulic pressure supply device.

10. The hydraulic pressure supply system according to claim 9, wherein the second hydraulic pressure supply device uses an accumulator as a motive power source, and
wherein said hydraulic pressure control means includes a linear solenoid valve for adjusting the clutch supply hydraulic pressure, and in a case where only hydraulic pressure from the second hydraulic pressure supply device is supplied to the clutch, said hydraulic pressure control means controls an opening of the linear solenoid valve to be more increased, compared with a case where hydraulic pressure is supplied from the first hydraulic pressure supply device to the clutch.

11. The hydraulic pressure supply system according to claim 1, wherein the second hydraulic pressure supply device uses an accumulator as a motive power source, and wherein said hydraulic pressure control means includes a linear solenoid valve for adjusting the clutch supply hydraulic pressure, and in a case where only hydraulic pressure from the second hydraulic pressure supply device is supplied to the clutch, said hydraulic pressure control means controls an opening of the linear solenoid valve to be more increased, compared with a case where hydraulic pressure is supplied from the first hydraulic pressure supply device to the clutch.

* * * * *